United States Patent [19]

Akimoto et al.

[11] Patent Number: 5,142,036
[45] Date of Patent: Aug. 25, 1992

[54] POLYOXYALKYLENE ALKENYL ETHER-MALEIC ESTER COPOLYMER AND USE THEREOF

[75] Inventors: Shin-ichi Akimoto; Susumu Honda, both of Tokyo; Tohru Yasukohchi, Kanagawa, all of Japan

[73] Assignee: Nippon Oil and Fats Co., Ltd., Tokyo, Japan

[21] Appl. No.: 450,486

[22] Filed: Dec. 14, 1989

[30] Foreign Application Priority Data

Dec. 16, 1988 [JP] Japan .................. 63-316173

[51] Int. Cl.$^5$ .................. C08F 210/14; C08F 122/04
[52] U.S. Cl. .................. 536/18.3; 526/271; 526/318.3; 525/327.8; 106/823
[58] Field of Search .................. 106/90, 314, 315; 526/271, 318.3; 525/327.8; 536/18.3

[56] References Cited

U.S. PATENT DOCUMENTS

| | | | |
|---|---|---|---|
| 4,471,100 | 9/1984 | Tsubakimoto et al. | 525/367 |
| 4,946,904 | 8/1990 | Akimoto et al. | 526/271 |
| 4,946,918 | 8/1990 | Akiyama et al. | 526/271 |

FOREIGN PATENT DOCUMENTS

| | | |
|---|---|---|
| 0056627 | 7/1982 | European Pat. Off. |
| 0315167 | 5/1989 | European Pat. Off. |

OTHER PUBLICATIONS

Derwent Abstract of JP-A-59-162162.
Database WPIL, No. 84-266252, Derwent Publications Ltd., London, GB; & JP-A-59 162 162 (Sanyo Chem. Ind. Ltd) (Cat. D).
Database WPIL, No 90-232609, Derwent Publications Ltd., London, GB; & JP-A-379 676 (Nippon Oil and Fats Co.).

*Primary Examiner*—Ronald W. Griffin
*Attorney, Agent, or Firm*—Sughrue, Mion, Zinn, Macpeak & Seas

[57] ABSTRACT

A copolymer of (a) a polyoxyalkylene alkenyl ether represented by formula (I):

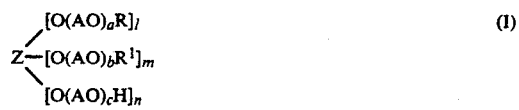

wherein Z is a residue of a compound having from 2 to 8 hydroxyl groups; AO is an oxyalkylene group having from 2 to 18 carbon atoms; R is an alkenyl group having from 2 to 18 carbon atoms; $R^1$ is a hydrocarbon group having from 1 to 40 carbon atoms; $a \geq 0$; $b \leq 0$; $c \leq 0$; $1 \leq l$; $m \leq 0$; $z \leq 0$; $l+m+n=2$ to 8; $al+bm+cn=1$ to 100; and $n/(l+m+n) \leq 1/3$, and (b) a maleic ester of a compound represented by formula (II):

$$R^2O(A^1O)_dH \quad (II)$$

wherein $R^2$ is a hydrocarbon group having from 1 to 40 carbon atoms; $A^1O$ is an oxyalkylene group having from 2 to 18 carbon atoms; and d is from 0 to 100; or formula (III):

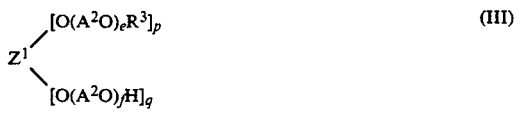

wherein $Z^1$ is a residue of a compound containing from 2 to 8 hydroxyl groups; $A^2O$ is an oxyalkylene group having from 2 to 18 carbon atoms; $R^3$ is a hydrocarbon group having from 1 to 40 carbon atoms; $e<0$; $f<0$; $p<0$; $q \leq 1$; $p+q=2$ to 8; and $ep+fq=0$ to 100. The copolymer is useful as an emulsifier, a dispersant, or an additive for cement.

4 Claims, 2 Drawing Sheets

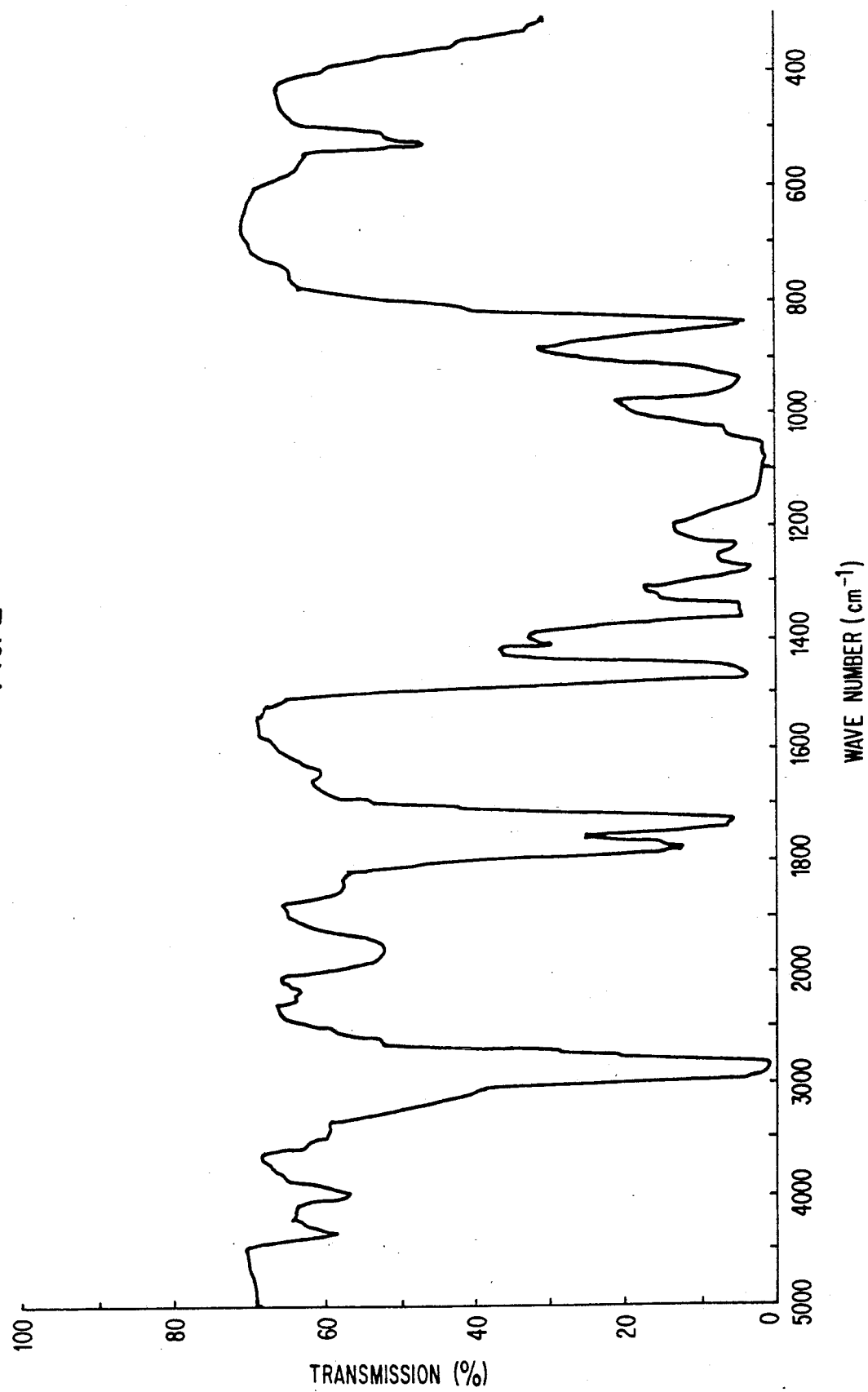

POLYOXYALKYLENE ALKENYL ETHER-MALEIC ESTER COPOLYMER AND USE THEREOF

FIELD OF THE INVENTION

This invention relates to a novel copolymer of a polyoxyalkylene alkenyl ether and a maleic ester and an emulsifier, dispersant or cement additive comprising the same.

BACKGROUND OF THE INVENTION

Copolymers of maleic anhydride and a compound having an unsaturated group have found their application in various fields. For example, a salt of a diisobutylene-maleic anhydride copolymer is used as a dispersant in an aqueous system as described in *Cement & Concrete*, No. 478, p. 7 (1986), and an ethyl or butyl ester of a methyl vinyl ether-maleic anhydride copolymer is used in cosmetics as described in *Nippon Hanyo Keshokin Genryoshu*, p. 161, K. K. Yakuji Nipposha (1985). It has been proposed to use a copolymer of a polyoxyalkylene monoalkenyl ether and a maleic ester of a polyalkylene glycol or a monoalkyl ether thereof as a dispersant for cement as disclosed in JP-A-59-162162 (the term "JP-A3[ as used herein means an "unexamined published Japanese patent application").

However, copolymers of an olefin, e.g., diisobutylene, and maleic anhydride, while non-neutralized, are soluble only in limited kinds of solvents such as toluene. When converted to their salts, they are soluble only in water. Further, having an average molecular weight in the thousands, these copolymers are limited in application.

Esters of methyl vinyl ether-maleic anhydride copolymers are poor in lipophilic properties and therefore unsuitable for use as an emulsifier or dispersant.

Copolymers of a polyoxyalkylene monoalkenyl ether and a maleic ester of a polyalkylene glycol or a monoalkyl ether thereof, though effective as additive for cement, exhibit poor lipophilic properties. Further, similarly to the α-olefinmaleic anhydride copolymers, they are of limited application due to their average molecular weight in the thousands.

SUMMARY OF THE INVENTION

An object of this invention is to provide a novel copolymer which is of wide application as an emulsifier, a dispersant, an additive for cement, and the like.

This invention provides a copolymer of (a) a polyoxyalkylene alkenyl ether represented by formula (I):

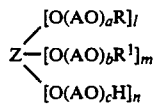

wherein Z is a residue of a compound having from 2 to 8 hydroxyl groups; AO is an oxyalkylene group having from 2 to 18 carbon atoms; R is an alkenyl group having from 2 to 18 carbon atoms; $R^1$ is a hydrocarbon group having from 1 to 40 carbon atoms; $a \geq 0$; $c \geq 0$; $l \geq 1$; $m \geq 0$; $n \geq 0$; $l+m+n=2$ top 8; $al+bm+cn=1$ to 100; and $n/(l+m+n) \leq \frac{1}{2}$, and (b) a maleic ester of a compund represented by formula (II):

$$R^2O(A^1O)_dH \qquad (II)$$

wherein $R^2$ is a hydrocarbon group having from 1 to 40 carbon atoms; $A^1O$ is an oxyalkylene group having from 2 to 18 carbon atoms; and d is from 0 to 100; or formula (III):

wherein $Z^1$ is a residue of a compound containing from 2 to 8 hydroxyl groups; $A^2O$ is an oxyalkylene group having from 2 to 18 carbon atoms; $R^3$ is a hydrocarbon group having from 1 to 40 carbon atoms; $e \geq 0$; $f \geq 0$; $p \geq 0$; $q \geq 1$; $p+q=2$ to 8; and $ep+fq=0$ to 100.

BRIEF DESCRIPTION OF THE DRAWINGS

FIG. 2 is an infrared absorption spectrum of the copolymer prepared in Example 3.

DETAILED DESCRIPTION OF THE INVENTION

Figure 1:
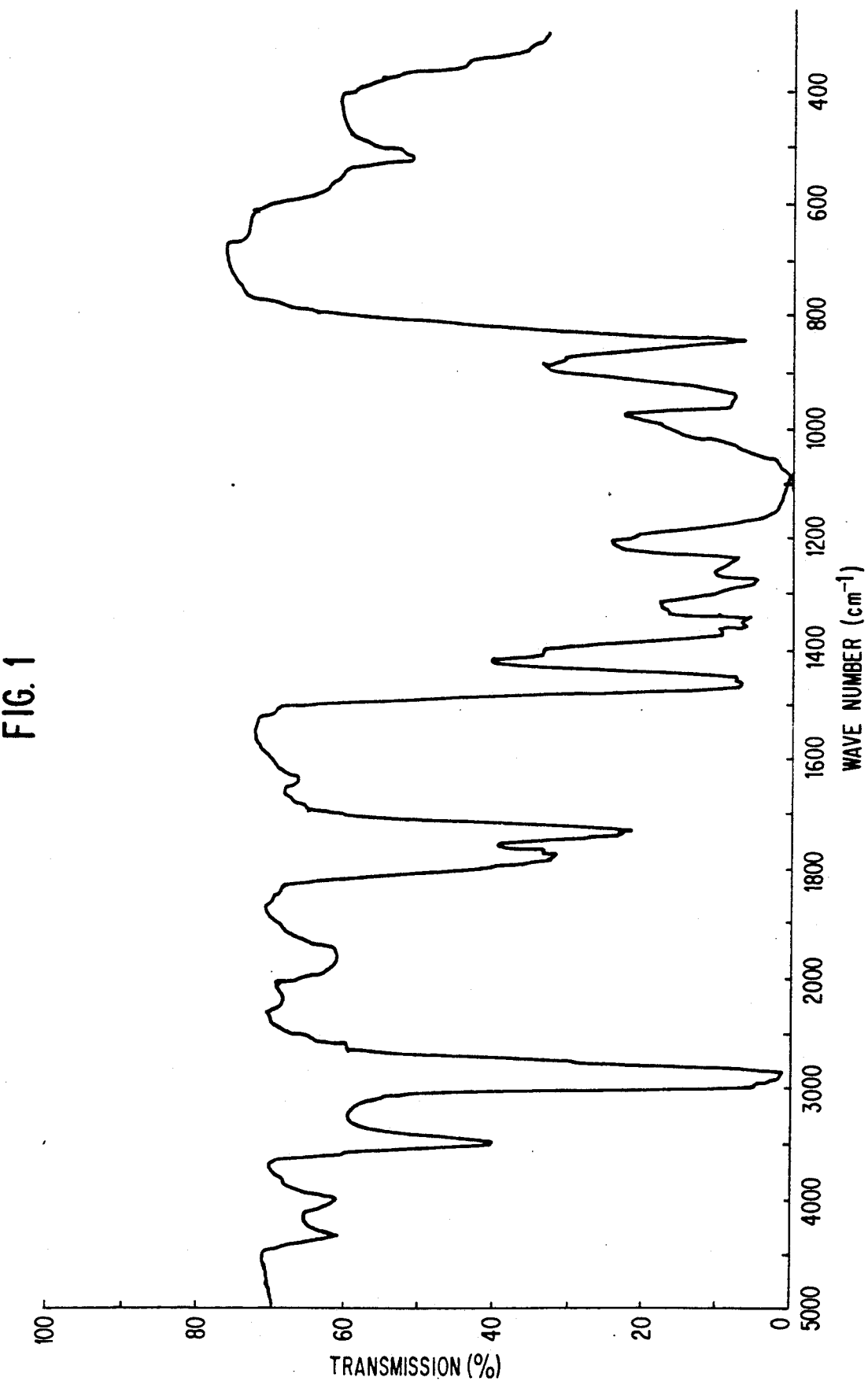
FIG. 1 is an infrared absorption spectrum of the copolymer prepared in Example 2.

A molar ratio of component (a) to component (b) in the copolymer of the present invention is preferably from 3:7 to 7:3, more preferably about 1:1.

In formula (I), the hydroxyl-containing compound providing a residue represented by Z includes glycols, e.g., ethylene glycol, propylene glycol, butylene glycol, hexylene glycol, styrene glycol, an alkylene glycol having from 8 to 18 carbon atoms, and neopentyl glycol; polyhydric alcohols, e.g., glycerin, diglycerin, polyglycerin, trimethyloletahen, trimethylolpropane, 1,3,5-pentanetriol, erythritol, pentaerythritol, dipentaerythritol, sorbitol, sorbitan, sorbide, a condensation product of sorbitol and glycerin, adonitrol, arabitol, xylitol, and mannitol; partial ethers or esters of the polyhydric alcohol; saccharides, e.g., xylose, arabinose, ribose, rhamnose, glucose, fructose, galactose, mannose, sorbose, cellobiose, maltose, isomaltose, trehalose, sucrose, raffinose, gentianose, and melezitose; and partial ethers or esters of the saccharide.

The oxyalkylene group as represented by AO is derived from ethylene oxide, propylene oxide, butylene oxide, tetrahydrofuran, styrene oxide, an α-olefin oxide having from 6 to 18 carbon atoms, etc. Specific examples are oxyethyelene, oxypropylene, oxybutylene, oxytetramethylene, and oxystyrene groups and an oxyalkylene group having from 6 to 18 carbon atoms. Where the oxyalkylene group comprises two or more kinds of alkylene moieties, they may be linked either in blocks or at random.

The alkenyl group having from 2 to 18 carbon atoms as represented by R preferably includes those having an unsaturated bond at the terminal thereof, e.g., vinyl, allyl, methallyl, isoprenyl, dodecenyl, octadecenyl, and allylphenyl groups.

The hydrocarbon group having from 1 to 40 carbon atoms as represented by $R^1$ includes methyl, ethyl, propyl, isopropyl, butyl, isobutyl, t-butyl, amyl, isoamyl, hexyl, heptyl, octyl, 2-ethylhexyl, nonyl, decyl, undecyl, dodecyl, isotridecyl, tetradecyl, hexadecyl, isocetyl, octadecyl, isostearyl, oleyl, octyldodecyl, docosyl, decyltetradecyl, benzyl, cresyl, butylphenyl, dibutylphenyl, octylphenyl, nonylphenyl, dodecylphenyl, dioctylphenyl, dinonylphenyl, and styrenated phenyl groups.

In formula (I), l, m, and n are limited for the reasons set forth below. l must be at least 1 for accomplishing copolymerization. If the number of hydroxyl groups, i.e., n, is too large, copolymerization with maleic anhydride would be attended by esterification with maleic anhydride, unfavorably resulting in formation of a three-dimensional structure. Accordingly, a relation of $n/(l+m+n) \leq \frac{1}{3}$ is preferred.

In formulae (II) and (III), $R^2$ and $R^3$ have the same meaning as $R^1$; $A^1O$ and $A^2O$ have the same meaning as AO; and Z: has the same meaning as Z.

The copolymer according to the present invention can be prepared as follows. The polyoxyalkylene alkenyl ether of formula (I) and maleic anhydride are copolymerized in the presence of a radical polymerization initiator such as benzoyl peroxide. The resulting copolymer is then esterified with the compound of formula (II) or (III). Alternatively, maleic anhydride and the compound of formula (II) or (III) are subjected to esterification, and the resulting ester is then copolymerized with the polyoxyalkylene alkenyl ether of formula (I) in the presence of a radical polymerization initiator.

The maleic ester unit in the copolymer may be in the form of a monoester or a diester.

The copolymer according to the present invention is a high-molecular weight surface active agent having a weight average molecular weight of more than 1,000, sometimes far up in the ten thousands. The hydrophilic moiety of the copolymer is assigned to the oxyethylene group and hydroxyl group in AO, $A^1O$ or $A^2O$ and a carboxyl group formed on ester formation, while the lipophilic moiety is assigned to the hydrocarbon group in $R^1$, $R^2$ or $R^3$ and the oxyalkylene group having 3 or more carbon atoms in AO, $A^1O$ or $A^2O$ Thus, it is possible to increase the proportion of the hydrophilic moiety for use as a water-soluble compound, for example, an additive for cement or a dispersant in an aqueous system, or to increase the proportion of the lipophilic moiety for use as an oil-soluble compound, for example, a dispersant for a non-aqueous system. For use as an oil-soluble compound, the copolymer of the present invention may further contain other lipophilic units derived from lipophilic moieties copolymerizable with the polyoxyalkylene alkenyl ether and maleic anhydride, e.g., styrene, α-olefins, acrylic esters, methacrylic esters, and vinyl acetate.

The polyoxyalkylene alkenyl ether-maleic ester copolymer having the specific structure as described above is a high-molecular weight surface active agent which can be rendered either water-soluble or oil-soluble and is of very wide application as an emulsifier, a dispersant, or an additive for cement.

The present invention is now illustrated in greater detail by way of Examples, but it should be understood that the present invention is not deemed to be limited thereto. All the percents are by weight unless otherwise indicated.

PREPARATION EXAMPLE 1

Preparation of Compound of Formula (I)

In an autoclave were charged 32 g of methanol and 1.1 g of sodium methylate as a catalyst. After purging the autoclave with nitrogen, 396 g of ethylene oxide was slowly introduced thereinto at 140° C. at a pressure of from about 0.5 to 5 kg/cm²G to conduct an addition reaction After completion of the reaction, the reaction mixture was cooled to room temperature, 75 g of sodium hydroxide was added thereto, followed by heating to 110° C., and the mixture was dehydrated in a nitrogen atmosphere under reduced pressure of about 20 mmHg. Nitrogen was then added thereto to raise the pressure to 1 kg/cm²G, and . 98 g of allyl chloride was slowly added to the mixture while stirring. The alkalinity of the reaction mixture fell and, after 4 hours from the commencement of reaction, assumed a nearly steady value, at which the reaction was stopped. The reaction mixture was neutralized with hydrochloric acid, and the by-produced salt was separated by filtration to recover an allyl ether.

PREPARATION EXAMPLE 2

Preparation of Compound of Formula (I)

In an autoclave were charged 58 g of allyl alcohol and 5.6 g of potassium hydroxide as a catalyst. After purging the autoclave with nitrogen, 2320 g of propylene oxide was slowly introduced thereinto at 100° C. at a pressure of from about 0.5 to 5 kg/cm²G to conduct an addition reaction. After completion of the reaction, the catalyst was neutralized with hydrochloric acid, and the by-produced potassium chloride was removed by filtration. To 1624 g of the recovered product was slowly added 21 g of metallic sodium, the mixture was heated to 110° C., and 186 g of dodecyl chloride was added thereto while stirring. The alkalinity of the reaction mixture fell and, after 4 hours from the commencement of the reaction, assumed an almost steady value, at which the reaction was ceased. The reaction mixture was neutralized with hydrochloric acid, and the by-product salt was removed to obtain an allyl ether.

PREPARATION EXAMPLE 3

Preparation of Compound of Formula (I)

In an autoclave were charged 92 g of glycerin, 5 g of boron trifluoride ethyl etherate as a catalyst, and 432 g of tetrahydrofuran. After purging the autoclave with nitrogen, 264 g of ethylene oxide was slowly introduced thereinto at 70° C. at a pressure of from about 0.5 to 5 kg/cm²G to conduct an addition reaction. After completion of the reaction, the catalyst was neutralized with sodium carbonate, and the by-produced salt was removed by filtration. To 630.4 g of the reasulting product was slowly added 50 g of metallic sodium, and 180 g of methallyl chloride was slowly added thereto at 100° C.with stirring. The alkalinity of the reaction mixture fell and, after 4 hours from the start of the reaction, assumed an almost steady value, at which the reaction was stopped. The reaction mixture was neutralized with hydrochloric acid, and the by-produced salt was removed by filtration to recover a methallyl ether.

PREPARATION EXAMPLES 4 TO 12

Various polyoxyalkylene alkenyl ethers of formula (I) shown in Table 1below were prepared in the same manner as in Preparation Examples 1 to 3.

TABLE 1

| Preparation Example No. | Compound of Formula (I) | Degree of Unsaturation (milleq/g) | Hydroxyl Value (KOH-mg/g) |
|---|---|---|---|
| 1 | $CH_2=CHCH_2(OC_2H_4)_9OCH_3$ | 2.13 | 0.08 |
| 2 | $CH_2=CHCH_2(OC_3H_6)_{40}OC_{12}H_{25}$ | 0.39 | 0.18 |
| 3* | $CH_2O\{(C_4H_8O)_2(C_2H_4O)_2\}CH_2C(CH_3)=CH_2$<br>$CHO\{C_4H_8O)_2(C_2H_4O)_2\}H$<br>$CH_2O\{(C_4H_8O)_2(C_2H_4O)_2\}CH_2C(CH_3)=CH_2$ | 2.14 | 71 |
| 4 | $CH_2=CHCH_2(OC_2H_4)_4OCH_3$ | 3.99 | 0.04 |
| 5 | $CH_2=CHCH_2(OC_2H_4)_{33}OCH_3$ | 0.62 | 0.03 |
| 6 | $CH_2=CHCH_2(OC_2H_4)_2OC_4H_9$ | 4.98 | 0.24 |
| 7 | $CH_2=C(CH_3)CH_2(OC_2H_4)_{28}OC_{16}H_{33}$ | 0.65 | 0.15 |
| 8 | $CH_2=C(CH_3)CH_2CH_2(OC_2H_4)_{10}(OC_3H_6)_{10}OC_{18}H_{37}$ | 0.73 | 0.22 |
| 9 | $CH_2=CHCH_2(OC_2H_4)_{20}OCH_2CH=CH_2$ | 2.16 | 0.07 |
| 10 | $CH_2=CHCH_2(OC_2H_4)_{20}OC_{18}H_{37}$ | 0.84 | 0.13 |
| 11 | $CH_2O(C_2H_4O)_3CH_2CH=CH_2$<br>$CHO(C_2H_4O)_3CH_3$<br>$CH_2$<br>$O$<br>$CH_2$<br>$CHO(C_2H_4O)_3CH_3$<br>$CH_2$<br>$O$<br>$CH_2$<br>$CHO(C_2H_4O)_3CH_3$<br>$CH_2O(C_2H_4O)_3CH_3$ | 1.15 | 0.16 |
| 12 | $CH_2=CHCH_2OCH_2C(CH_2(OC_2H_4)_4OCH_3)(CH_2(OC_2H_4)_4OCH_3)CH_2(OC_2H_4)_4OCH_3$ | 1.31 | 0.07 |

Note:
*Additon mode in the brackets { } is at random, and $C_4H_8O$ is an oxytetramethylene group.

PREPARATION EXAMPLE 13

Preparation of Maleic Anhydride Copolymer

| Preparation of Maleic Anhydride Copolymer | | |
|---|---|---|
| Allyl ether of Preparation Example 1 | 468 g | (1 mol) |
| Maleic Anhydride | 98 g | (1 mol) |
| Benzoyl peroxide | 6 g | (1% based on monomers) |
| Toluene | 566 g | (the same weight as monomers) |

The above components were charged in a four-necked flask equipped with a cooling pipe, a pipe for introducing nitrogen, a thermometer, and a stirrer. The mixture was heated to 80° C. in a nitrogen stream and stirred for 4 hours to conduct a copolymerization reaction.

Toluene was removed by distillation at 110° C. under reduced pressure of about 10 mmHg to obtain 510 g of a maleic anhydride copolymer as a clear viscous liquid.

The resulting maleic anhydride copolymer was analyzed to obtain the following results:

Elementary Analysis: Calcd. (%): C 55.11; H 8.18; Found (%): C 55.07; H 8.1.

Degree of Saponification: 196.3 (calcd.: 198.2)

Weight Average Molecular Weight: 13300 (measured by gel-permeation chromatography, hereinafter the same)

EXAMPLE 1

A copolymerization reaction was carried out in the same manner as in Preparation Example 13, except for using the following components and changing the copolymerization temperature to 70° C.

| | | |
|---|---|---|
| Alkenyl ether of Preparation Example 4 | 248 g | (1 mol) |
| Bis(ethylene glycol) maleate | 204 g | (1 mol) |
| Azobisisobutyronitrile | 5 g | (1.1% based on monomers) |
| Toluene | 452 g | (the same weight as monomers) |

Toluene was removed by distillation at 110° C. under reduced pressure of about 10 mmHg to obtain 420 g of a copolymer as a clear viscous liquid.

Elementary Analysis: Calcd. (%): C 52.5; H 7.5; Found (%): C 52.0; H 7.0.

Degree of Saponification: 240 (calcd.: 248)

Weight Average Molecular Weight: 2000

EXAMPLE 2

In 600 g of pyridine were dissolved 550 g of the maleic anhydride copolymer as obtained in Preparation Example 13 and 600 g of a polyoxyethylene polyoxypropylene glycol random copolymer having a structural formula of $HO\{C_3H_6O\}_7(C_2H_4O)_4\}H$, and the solution was refluxed at 110° to 120° C. for 4 hours. Pyridine was removed by distillation under reduced pressure of 10 mmHg or less at 110° to 120° C. to obtain 1085 g of a copolymer as a clear viscous liquid.

Elementary Analysis: Calcd. (%): C 57.1; H 8.4; Found (%): C 56.4; H 8.4.

Degree of Saponification: 93.2 (calcd.: 92.3)

Weight Average Molecular Weight: 13,500

The infrared absorption spectrum of the copolymer is shown in FIG. 1.

EXAMPLE 3

The same procedure of Example 2 was repeated, except for replacing the compound as used in Example 2 with 46 g of ethanol and changing the reaction temperature to 70° to 80° C., to obtain 590 g of a copolymer as a clear viscous liquid.

Elementary Analysis: Calcd. (%): C 54.9; H 8.5; Found (%): C 54.6; H 8.2.

Degree of Saponification: 188 (calcd.: 183)

Weight Average Molecular Weight: 13,300

EXAMPLES 4 TO 12

Copolymers shown in Table 2 below were prepared in the same manner as in the foregoing Examples.

TABLE 2

| Example No. | Compound of Formula (I) Preparation Example No. | Amount (mol %) | Maleic Anhydride (mol %) | Other Monomer (mol %) | OH-Containing Compound (inclusive of Maleic Acid Ester) (mol %) | Polymerization Initiator (mol %) | Average Molecular Weight | Description*4 | Solubility in Water | Solubility in Acetone Methanol Ethanol |
|---|---|---|---|---|---|---|---|---|---|---|
| 1 | 4 | 50 | — | — | bis(ethylene glycol) maleate 50 | AIBN*1 1.1 | 2,000 | liquid | soluble | soluble |
| 2 | 1 | 50 | 50 | — | HO{($C_3H_6O$)$_7$($C_2H_4O$)$_4$}H (random copolymer) | BPO*2 1.0 | 13,500 | " | " | " |
| 3 | 1 | 50 | 50 | — | ethanol | BPO*2 1.0 | 13,300 | " | " | " |
| 4 | 2 | 50 | 50 | — | HO($C_2H_4O$)$_{21}$H | BPEH*3 1.0 | 20,000 | " | insoluble | " |
| 5 | 5 | 50 | 50 | — | $C_{18}H_{17}$O($C_2H_4O$)$_{20}$H | BPO*2 1.0 | 18,500 | solid | soluble | " |
| 6 | 6 | 50 | — | — | diisopropyl maleate | BPO*2 1.0 | 3,500 | liquid | " | " |
| 7 | 7 | 50 | 50 | — | $CH_2$O—($C_3H_6O$)$_2$H<br>CHO—($C_3H_6O$)$_2$H<br>$CH_2$O—($C_3H_6O$)$_2$H | BPEH*3 0.7 | 130,000 | solid | " | " |
| 8 | 8 | 50 | 50 | styrene 50 | $C_9H_{19}$—$C_6H_4$—O($C_2H_4O$)$_{10}$H | AIBN*1 0.9 | 16,300 | liquid | " | " |
| 9 | 10 | 40 | 50 | vinyl acetate 2 | $C_4H_9$O($C_3H_6O$)$_5$OH | BPO*2 1.2 | 7,400 | solid | " | " |
| 10 | 11 | 44 | 50 | — | $C_{12}H_{25}$OH | BPO*2 0.9 | unmeasurable | " | insoluble | insoluble |
| 11 | 3 | 46 | 50 | ethyl methacrylate 4 | HO($C_2H_4O$)$_7$H | BPEH*3 1.0 | unmeasurable | solid | insoluble | insoluble |
| 12 | 9 | 40 | 50 | — | HO($C_3H_6O$)$_5$H | BPO*2 1.0 | " | " | " | " |
| 13 | 1 | 50 | 50 | — | $C_4H_9$O{($C_2H_4O$)$_6$($C_3H_6O$)$_2$}H (random copolymer) | BPEH*3 1.0 | 14,400 | liquid | soluble | soluble |
| 14 | 5 | 50 | 50 | — | $CH_3$O($C_2H_4O$)$_{12}$H | BPEH*3 1.0 | 17,200 | solid | " | " |

Notes:
*1 Azobisisobutyronitrile
*2 Benzoyl peroxide
*3 t-Butyl peroxy-2-ethylhexanoate
*4 at 20° C.

EXAMPLE 15

Each of the copolymers prepared in Examples 4 to 9 was tested for performance as an emulsifier in the following composition.

| | |
|---|---|
| Polydimethylsiloxane (100,000 cst) | 35% |
| Emulsifier | 5% |
| Water | 60% |

A mixture of polydimethylsiloxane and the copolymer was heated to 70° C., and water at 70° C. was slowly added thereto to emulsify the mixture. The resulting emulsion was allowed to stand in a thermostat at 40° C. for 1 month to examine emulsion stability.

For comparison, the same test was conducted but using the same amount of a nonionic surface active agent in place of the copolymer of the present invention.

The results of examination are shown in Table 3 below.

TABLE 3

| Emulsifier of Example | State of Emulsion After Standing | Remarks |
|---|---|---|
| Example 4 | Milky white liquid | Invention |
| Example 5 | " | " |
| Example 6 | " | " |
| Example 7 | " | " |
| Example 8 | " | " |
| Example 9 | " | " |
| $C_{18}H_{37}O(C_2H_4O)_6H$ | separated in two layers | Comparison |
| 1:1 (by weight) mixture of sorbitan monostearate and polyoxyethylene (20 mol) sorbitan monosterate | separated in two layers | " |

It can be seen from Table 3 that the emulsions using the copolymer of the present invention keeps to be stable milky white liquid, proving that the copolymer is an excellent emulsifier.

EXAMPLE 16

Each the copolymers prepared in Example 1 to 9 was tested for performance as a dispersant in the following composition.

| | |
|---|---|
| Calcium stearate | 50% |
| Dispersant | 5% |
| Water | 45% |

The dispersant was dissolved in water, and calcium stearate was slowly added and dispersed in the solution at 50° C. while stirring by means of a homogenizer to obtain a white viscous slurry. The slurry was allowed to stand in a thermostat at 40° C. for 1 month was carried out using the same amount of a nonionic surface active agent in place of the copolymer of the present invention. The results of the test are shown in Table 4 below.

TABLE 4

| Dispersant of Example | State of Dispersion After Standing | Remarks |
|---|---|---|
| Example 1 | Fluidity was maintained | Invention |
| Example 2 | Fluidity was maintained | " |
| Example 3 | Fluidity was maintained | " |
| Example 4 | Fluidity was maintained | " |
| Example 5 | Fluidity was maintained | " |
| Example 6 | Fluidity was maintained | " |
| Example 7 | Fluidity was maintained | " |
| Example 8 | Fluidity was maintained | " |
| Example 9 | Fluidity was maintained | " |
| $C_8H_{17}-C_6H_4-O(C_2H_4O)_{15}H$ | Solidified | Comparison |
| $C_{18}H_{37}O(C_2H_4O)_{30}H$ | " | " |
| Polyoxyethylene (20 mol) sorbitan monostearate | " | " |

It can be seen from Table 4 that the slurries using the copolymer of the present invention as a dispersant maintained a slurry state of stable fluidity, whereas those using a comparative dispersant solidified and lost fluidity.

EXAMPLE 17

Each of the copolymers prepared in Examples 1 to 14 was tested for performance as an additive for cement in the following composition.

| | |
|---|---|
| Water | 165 kg/m$^3$ |
| Cement | 300 kg/m$^3$ |
| Sand | 758 kg/m$^3$ |
| Gravel (max. size: 25 mm) | 1067 kg/m$^3$ |
| Air entrainng and water reducing agent ("Pozzolith No. 5L" produced by Nisso Master Builders Co., Ltd.) | 0.75 kg/m$^3$ |
| Additive | 3 kg/cm$^3$ (1% based on cement) |
| Water/cement ratio | 55.0% |
| Sand percentage | 42.0% |

In accordance with JIS R 5201, the above components were kneaded in a mortar mixer, and the slump was measured every minutes. After 60 minutes in Run Nos. 15, 16 and 17 or after 90 minutes in other runs, the mixture was cast in a mold (10×10×40 cm), released from the mold after one day, cured in water at 20° C. for 7 days from the release, and then allowed to stand at 20° C. and 65% RH (relative humidity]. The dry shrinkage of each sample was measured using a comparator method. For reference, compressive strength of each sample was measured after being allowed to stand under the above-described conditions to the age of 35 days. The results of these measurements are shown in Table 5 below.

TABLE 5

| | | Slump (cm) | | | | Dry Shrinkage (%) | | | Compressive |
| | | Immediately After | After 30 | After 60 | After 90 | After | After | After | Strength |
| Run No. | Additive | Kneading | Min. | Min. | Min. | 7 Days | 14 Days | 28 Days | (kg/cm$^3$) |
|---|---|---|---|---|---|---|---|---|---|
| 1 (Invention) | Copolymer of | 17.2 | 16.9 | 16.5 | 15.6 | 0.020 | 0.035 | 0.044 | 397 |

TABLE 5-continued

| Run No. | Additive | Slump (cm) Immediately After Kneading | After 30 Min. | After 60 Min. | After 90 Min. | Dry Shrinkage (%) After 7 Days | After 14 Days | After 28 Days | Compressive Strength (kg/cm³) |
|---|---|---|---|---|---|---|---|---|---|
| 2 (Invention) | Copolymer of Example 1 | 18.0 | 17.4 | 17.3 | 17.2 | 0.010 | 0.026 | 0.027 | 423 |
| 3 (Invention) | Copolymer of Example 2 | 17.4 | 17.0 | 16.6 | 16.2 | 0.020 | 0.030 | 0.042 | 398 |
| 4 (Invention) | Copolymer of Example 3 | 18.0 | 17.7 | 17.5 | 17.0 | 0.020 | 0.028 | 0.039 | 407 |
| 5 (Invention) | Copolymer of Example 4 | 18.0 | 17.8 | 17.4 | 17.1 | 0.018 | 0.021 | 0.029 | 405 |
| 6 (Invention) | Copolymer of Example 5 | 17.5 | 17.0 | 16.4 | 15.9 | 0.019 | 0.029 | 0.037 | 396 |
| 7 (Invention) | Copolymer of Example 6 | 17.7 | 17.5 | 17.3 | 17.0 | 0.013 | 0.026 | 0.028 | 411 |
| 8 (Invention) | Copolymer of Example 7 | 17.8 | 17.4 | 17.2 | 17.0 | 0.016 | 0.025 | 0.031 | 408 |
| 9 (Invention) | Copolymer of Example 8 | 17.6 | 17.0 | 16.5 | 15.8 | 0.014 | 0.022 | 0.033 | 412 |
| 10 (Invention) | Copolymer of Example 9 | 17.4 | 16.8 | 16.2 | 15.7 | 0.017 | 0.022 | 0.033 | 406 |
| 11 (Invention) | Copolymer of Example 10 | 17.3 | 16.9 | 16.4 | 16.0 | 0.018 | 0.025 | 0.034 | 405 |
| 12 (Invention) | Copolymer of Example 11 | 17.5 | 17.0 | 16.3 | 16.0 | 0.020 | 0.027 | 0.036 | 403 |
| 13 (Invention) | Copolymer of Example 12 | 18.0 | 18.0 | 17.9 | 17.8 | 0.013 | 0.028 | 0.032 | 410 |
| 14 (Invention) | Copolymer of Example 13 | 17.7 | 17.9 | 18.0 | 17.9 | 0.019 | 0.030 | 0.038 | 405 |
| 15 (Comparison) | HO{$(C_3H_6O)_7(C_2H_4O)_3$}H*¹ | 16.0 | 12.2 | 9.0 | unmeasured | 0.013 | 0.029 | 0.030 | 420 |
| 16 (Comparison) | sodium naphthanenesulfonate formaldehyde condensate (mol. wt.: 4,000) | 17.3 | 12.5 | 8.8 | unmeasured | 0.024 | 0.046 | 0.060 | 400 |
| 17 (Comparison) | sodium diisobutylenemaleic anhydride copolymer (mol. wt.: 5,000) | 17.4 | 15.8 | 13.8 | 12.9 | 0.025 | 0.044 | 0.060 | 393 |
| 18 (Comparison) | none | 14.0 | 11.2 | 8.3 | unmeasured | 0.026 | 0.046 | 0.060 | 395 |

Note: *¹ The bracket { } means a random copolymer

As is shown in Table 5, the copolymers according to the present invention are excellent in prevention of slump loss and dry shrinkage without adversely affecting compressive strength.

While the invention has been described in detail and with reference to specific embodiments thereof, it will be apparent to one skilled in the art that various changes and modifications can be made therein without departing from the spirit and scope thereof.

What is claimed is:

1. A copolymer of (a) a polyoxyalkylene alkenyl ether represented by formula (I):

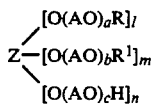
(I)

wherein Z is a residue of a compound having from 2 to 8 hydroxyl groups; AO is an oxyalkylene group having from 2 to 18 carbon atoms; R is an alkenyl group having from 2 to 18 carbon atoms; $R^1$ is a hydrocarbon group having from 1 to 40 carbon atoms; $a \geq 0$; $b \geq 0$; $c \geq 0$; $l \geq 1$; $m \geq 0$; $n \geq 0$; $l+m+n = 2$ to 8; $al+bm+cn = 1$ to 100; and $n/(l+m+n) \leq \frac{1}{3}$, and (b) a maleic ester of a compound represented by formula (II):

$$R^2O(A^1O)_dH \qquad (II)$$

wherein $R^2$ is a hydrocarbon group having from 1 to 40 carbon atoms; $A^1O$ is an oxyalkylene group having from 2 to 18 carbon atoms; and d is from 1 to 100; or formula (III):

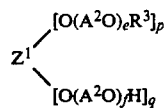
(III)

wherein $Z^1$ is a residue of a compound containing from 2 to 8 hydroxyl groups; $A^1O$ is an oxyalkylene group having from 2 to 18 carbon atoms; $R^3$ represents a hydrocarbon group having from 1 to 40 carbon atoms; $e \geq 0$; $f \geq 0$; $p \geq 0$; $q \geq 1$; $p+q = 2$ to 8; and $ep+fq = 0$ to 100.

2. An emulsifier composition comprising a carrier therefor and a copolymer as in claim 1.

3. A dispersant composition comprising a carrier therefor and a copolymer as in claim 1.

4. An additive for a cement composition comprising a carrier therefor and a copolymer as in claim 1.